(12) United States Patent
Gitt et al.

(10) Patent No.: US 8,408,084 B2
(45) Date of Patent: Apr. 2, 2013

(54) DUAL CLUTCH TRANSMISSION DEVICE

(75) Inventors: Carsten Gitt, Stuttgart (DE); Detlef Schnitzer, Denkendorf (DE); Alexander Weidler, Stuttgart (DE)

(73) Assignee: Daimler AG, Stuttgart (DE)

( * ) Notice: Subject to any disclaimer, the term of this patent is extended or adjusted under 35 U.S.C. 154(b) by 454 days.

(21) Appl. No.: 12/661,702

(22) Filed: Mar. 22, 2010

(65) Prior Publication Data

US 2010/0218643 A1    Sep. 2, 2010

Related U.S. Application Data

(63) Continuation-in-part of application No. PCT/EP2008/007521, filed on Sep. 12, 2008.

(30) Foreign Application Priority Data

Oct. 5, 2007   (DE) .......................... 10 2007 047 671

(51) Int. Cl.
*F16H 3/08* (2006.01)
(52) U.S. Cl. ......................................................... 74/330
(58) Field of Classification Search .................... 74/330, 74/331; 475/218
See application file for complete search history.

(56) References Cited

U.S. PATENT DOCUMENTS

| | | | | |
|---|---|---|---|---|
| 6,869,379 B2 * | 3/2005 | Voss et al. | ...................... | 475/218 |
| 7,297,085 B2 * | 11/2007 | Klemen | ........................ | 475/280 |
| 7,597,644 B2 * | 10/2009 | Rodgers, II | .................... | 475/218 |
| 7,604,561 B2 * | 10/2009 | Earhart | ........................ | 475/218 |
| 8,051,732 B2 * | 11/2011 | Gitt | ................ | 74/331 |
| 2008/0188342 A1 | 8/2008 | Jackson | | |
| 2008/0245167 A1 * | 10/2008 | Gitt | ................. | 74/331 |
| 2009/0036247 A1 * | 2/2009 | Earhart et al. | .................. | 475/35 |

FOREIGN PATENT DOCUMENTS

| | | | |
|---|---|---|---|
| DE | 10 2005 044 068 | | 3/2007 |
| DE | 102005044068 | * | 3/2007 |
| WO | 2007031193 | * | 3/2007 |

* cited by examiner

*Primary Examiner* — Ha D. Ho
(74) *Attorney, Agent, or Firm* — Klaus J. Bach

(57) ABSTRACT

In a dual clutch transmission with a main group and final shift group, with a coupling device for coupling a transmission element of the main group to a final shift group transmission element of the final shift group, the transmission comprises two transmission gears (V4L, V5L, V1 H, V2H) which can be formed simultaneously with one of the transmission gears (V4L, V5L) assignable to a lower group of the final shift group and another of the transmission gears (V1H, V2H) assignable to an upper group of the final shift group.

9 Claims, 1 Drawing Sheet

| Transmission Ratios of Main Group 10 | Transmission Ratios of Rear Mounted Group 11 | Transmission Gears |
|---|---|---|
| V1<br>V2<br>V3<br>V4<br>V5 | Short ratio, lower group | V1L |
| | | V2L |
| | | V3L |
| | | V4L |
| | | V5L |
| | Long ratio, upper group | V1H |
| | | V2H |
| | | V3H |
| | | V4H |
| | | V5H |

DUAL CLUTCH TRANSMISSION DEVICE

This is a Continuous-In-Part Application of pending international patent application PCT/EP2008/007521 filed Sep. 12, 2008 and claiming the priority of German patent application 10 2007 047 671.1 filed Oct. 5, 2007.

BACKGROUND OF THE INVENTION

The invention relates to a dual clutch transmission including a main group and a final group, and a coupling device for coupling a main group transmission element to a final group transmission element.

DE 10 2005 044 068 A1 discloses a dual clutch transmission device with a main group and with a final rear-mounted group, where transmission gears of one group of the final rear-mounted group can be power-shifted amongst each other, where a tensile force interruption occurs however when changing into another group of the final rear-mounted group.

It is in particular the principal object of the present invention to provide a dual clutch transmission where shifting between the groups under load is possible.

SUMMARY OF THE INVENTION

In a dual clutch transmission with a main group and final shift group, with a coupling device for coupling a transmission element of the main group to a final shift group transmission element of the final shift group, the transmission comprises two transmission gears (V4L, V5L, V1 H, V2H) which can be formed simultaneously with one of the transmission gears (V4L, V5L) assignable to a lower group of the final shift group and another of the transmission gears (V1H, V2H) assignable to an upper group of the final shift group.

It is suggested that the dual clutch transmission device comprises a clutch which is provided to couple a main group transmission element of the main group to a rear-mounted group transmission element of the rear-mounted group. A dual clutch transmission device can be realized by means of such a coupling device in a simple manner, where one can change between two groups of the rear-mounted group with power. In this connection, a "dual clutch transmission device" is especially meant to be a combination of a main group with two power shift clutches on the input side and a rear-mounted group, wherein the main group has main group transmission gears, which are spread advantageously by the rear-mounted group in that the rear-mounted group changes a transmission ratio between a main group transmission output shaft and an output shaft. In particular by way of the rear-mounted group, a number of transmission gears is obtained which is twice the number of the main group transmission gears. The transmission gears can be divided into a lower group, which is formed by the main group transmission gears with a short transmission ratio of the rear-mounted group, and an upper group, which is formed by the main group transmission gears with a long transmission ratio of the rear-mounted group.

If the main group transmission element is a gear wheel, the main group can advantageously be connected to the rear-mounted group for the group change under load.

It is further suggested that the rear-mounted group comprises a planetary wheel transmission. A rear-mounted group in the form of a planetary wheel transmission is of a particularly simple design.

The rear-mounted group transmission element, with which the main group transmission element can be coupled, is advantageously a planetary wheel carrier. A further coupling device, which is provided for the change of the group, can thereby be shifted in a load-free manner at least in one operating mode, whereby the group change is possible in a simple manner, in particular under load.

It is further suggested that the dual clutch transmission device comprises a dual clutch transmission take-off shaft connected to the rear-mounted group transmission element in a torque-proof manner. A drive torque can thereby advantageously be transmitted from the dual clutch transmission device to the rear mounted transmission element.

It is further suggested that the dual clutch transmission device has two transmission gears which can be formed simultaneously, wherein one of the transmission gears of a lower group can be assigned to the rear-mounted group, and one of the transmission gears of an upper group can be assigned to an upper group of the rear-mounted group. One can change thereby between the groups in a particularly simple manner. A "formed" transmission gear is thereby especially meant to be that the transmission gear is formed by coupling devices according to a shifting logic, but that the associated power shift clutch is still opened, which is why no drive torque can be transferred via the transmission gear. A "shifted" transmission gear is meant to be a formed transmission gear, in which the corresponding power shift clutch is closed, and via which a drive torque can be transferred.

The transmission gear of the lower group and the transmission gear of the upper group can advantageously be shifted simultaneously. One of the two transmission gears can thereby be optionally chosen which subsequently remains in the shifted position, while the other transmission gear is separated. "Shifted simultaneously" is thereby especially meant to be that the drive torque can be transferred in a parallel path via the transmission gears.

It is further suggested that one of the transmission gears can be formed by means of the main group transmission element. The coupling device can thereby simply be used for the group change.

In a first arrangement of the invention it is suggested that the transmission gears have the same transmission ratio. In this way, the group can be changed while the torque transfer can be maintained via a load shift clutch.

In a further arrangement of the invention, it is suggested that different load shift clutches can be assigned to the transmission gears. Thereby, the group can be changed in a simple manner via a change of the load shift clutch. The transmission gear of the upper group is thereby advantageously implemented as a connection gear to the transmission gear of the lower group.

The invention will become more readily apparent from the following description on the basis of the drawing which shows an embodiment of the invention.

DESCRIPTION OF A PARTICULAR EMBODIMENT

Figures 1, 2:
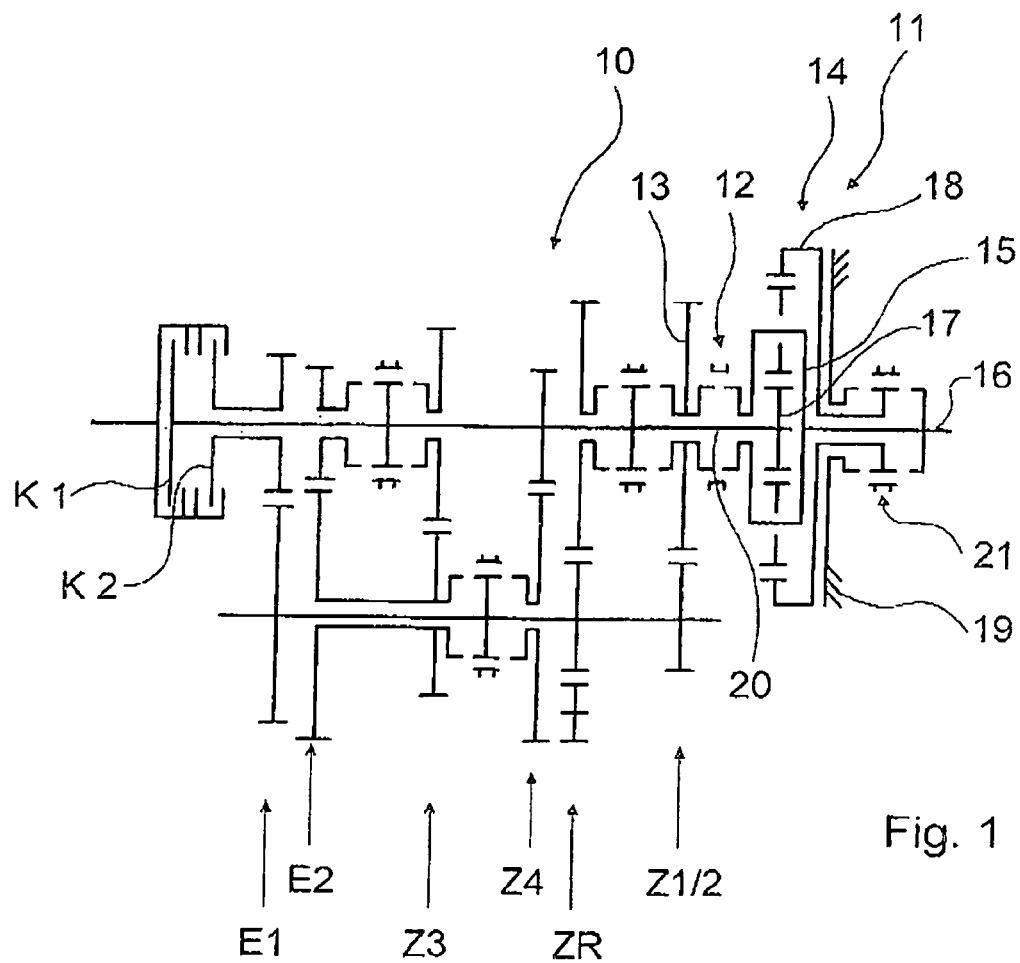
FIG. 1 shows a dual clutch transmission according to the invention.
FIG. 2 shows the designation of the transmission ratios of the main group and the rear or final groups.

FIG. 1 shows a dual clutch transmission with a main group 10 and a rear-mounted group 11. The main group 10 has six gear wheel planes E1, E2, Z1/2, Z3, Z4, ZR, formed by gear wheel pairs. By means of the main group 10, main group transmission gears V1-V5 (forward gears) and R1 (reverse gear) can be formed, of which the five main group transmission gears V1-V5 form main group transmission forward gears, and the main group transmission gear R1 is a main group reverse transmission gear. At least the main group transmission gears V1-V5 can be load-shifted amongst each other.

The rear-mounted group 11 has a planetary wheel transmission 14 with three rear-mounted group transmission elements. The first rear-mounted group transmission element is formed by a planetary wheel carrier 15, which is connected to a dual clutch transmission output shaft 16 in a torque-proof manner. The second rear-mounted group transmission element is formed by a sun wheel 17, which is connected to a main group transmission output shaft 20 in a torque-proof manner. The third rear-mounted group transmission element, which is formed by a hollow wheel 18, can optionally be connected to the planetary wheel carrier 15 or a transmission housing 19 via a coupling device 21.

A transmission ratio of the rear-mounted group 11 can be controlled by means of the coupling device 21. In particular, two transmission ratios can be formed between the main group transmission output shaft 20 and the dual clutch transmission take-off shaft 16 by means of the rear-mounted group 11, whereby a number of transmission gears (transmission shift gears, ratios) V1L-V5L, V1H-V5H are obtained, which is in particular twice as large as a number of the main group transmission gears V1-V5. The transmission gears V1L-V5L which are formed by means of a short transmission ratio of the rear-mounted group 11 are thereby assigned to a lower group of the rear-mounted group 11, and the transmission gears V1H-V5H, which are formed by means of a long transmission ratio of the rear-mounted group 11 are assigned to an upper group of the rear-mounted transmission group 11.

The lower group is formed in that the hollow wheel 18 is locked against the transmission housing 19 in the rear-mounted group 11 via the coupling device 21. The upper group is formed by connecting the hollow wheel 18 in the rear-mounted group 11 to the planetary wheel carrier 15 in a torque-proof manner via the coupling device 21, so that the planetary wheel transmission 14 is operated as a locked planetary gear.

The main group transmission output shaft 20 of the main group 10 is connected to the sun wheel 17 of the rear-mounted group 11 in a torque-proof manner. In order to realize a change between the groups that can be power-shifted, a coupling device 12 is arranged between one gear wheel 13 of the main group 10, which is provided for forming the two main group transmission gears V1, V2, and the planetary wheel carrier 15 of the rear-mounted group 11, via which coupling device the gear wheel 13 can be coupled to the planetary wheel carrier 15.

In an operating mode, in which a shifted transmission gear V1L-V5H is maintained, or in which one transmission gear V1L-V5H is changed by means of the main group 10 via the main group transmission gears V1-V5, a drive torque is transferred to the rear-mounted group 11 via the main group transmission output shaft 20. The coupling device 12 is opened in this operating mode.

In an operating mode, in which one can shift under load from one group to the other group, a transmission gear V5L of the lower group and a transmission gear V1H of the upper group are formed simultaneously by correspondingly coupling the corresponding coupling devices of a shifting logic into the main group 10. The transmission gear V1H of the upper group is thereby formed via the gear wheel 13, which is connected to the planetary wheel carrier 15 in this operating mode via the coupling device 12. The transmission gear V5L of the lower group is formed by means of a direct main group transmission gear V5. Both transmission gears V5L, V1H have the same transmission ratio in the main group 10 and in the rear-mounted group 11 due to the transmission ratios, whereby a number of transmission gears to be formed effectively, that is, with a different transmission ratio, is reduced by one transmission gear. Both transmission gears V5L, V1H are shifted simultaneously by closing one power shift clutch K1 assigned to the transmission gears V5L, V1H.

Furthermore, the gear wheel 13 is coupled to the planetary wheel carrier 15 in this operating mode via the coupling device 12. By means of the coupling of the gear wheel 13 to the planetary wheel carrier 15, the rear-mounted group 11 is free of any load, and within the rear-mounted group 11 the transmission gears V5L, V1H or the groups can be changed by means of the coupling device 21 without a load interruption. The load shift clutch K1, via which the drive torque is transmitted remains engaged in the process.

Alternatively, one of the first transmission gears V1H, V2H of the upper group can be formed as a connection gear of one of the last transmission gears V4L, V5L of the lower group. The two transmission gears V4L, V1H or V5L, V2H are assigned to different load shift clutches K1, K2. By coupling the gear wheel 13 to the planetary wheel carrier 15, the coupling device 12 can be shifted free of load, whereby a group change can be shifted in the rear-mounted group 11 without interruption of load. A change of the groups under load then takes place via a change of the power shift clutches K1, K2, by opening one load shift clutch K1, K2, while the other load shift clutch K2, K1 is closed. Thereby, a change from the transmission gear V4L to the transmission gear V1H and a change from the transmission gear V5L to the transmission gear V2H can be provided for the change of the group. The number of effective transmission gears is reduced by one transmission gear with both strategies.

A dual clutch transmission device, wherein shifting from one group to another under load is possible, can in principle be achieved with arbitrary main groups with at least two load shift clutches on the input side. It is assumed thereby that the lower group of the rear-mounted group is formed in that the hollow wheel (18) is locked against the transmission housing via the coupling device (21) in the rear mounted group, and that the upper group is formed in that the hollow wheel (18) is connected to the planetary wheel carrier via the coupling device (21) in a torque-proof manner and that the transmission is operated with a locked planetary gear transmission (14).

What is claimed is:

1. A dual clutch transmission with a main group (10) and final shift rear-mounted group (11), with a coupling device (12) for coupling a main group transmission element of the main group (10) to a final shift group transmission element of the final shift group (11), said transmission comprising two transmission shift gears (V4L, V5L, V1H, V2H) with the same transmission ratio so that a power path can be established simultaneously via one of the transmission gears (V4L, V5L) of the main group (10) and another via one of the transmission gears (V1H, V2H) of the final shift group (11), the final shift group (11) comprising a planetary wheel transmission (14), and the final shift group transmission element being a planetary wheel carrier (15) of the planetary wheel transmission (14).

2. The dual clutch transmission according to claim 1, wherein the main group transmission element is a gear wheel (13).

3. The dual clutch transmission device according to claim 1, wherein the dual clutch transmission includes an output shaft (16) connected to the final shift group transmission element in a torque-proof manner.

4. The dual clutch transmission device according to claim 1, wherein transmission gears (V4L, V5L) of the lower group and transmission gears of the upper group (V1H, V2H) are simultaneously shiftable.

5. The dual clutch transmission device according to claim 1, wherein one of the transmission gears (V1H, V2H) of the upper group can be formed by means of the main group transmission element.

6. The dual clutch transmission device according to claim 1, wherein transmission gears (V5L, V1H) of the upper and lower groups have the same transmission ratio.

7. The dual clutch transmission device according to claim 1, wherein different load shift clutches (K1, K2) are to be assigned to the lower and upper group transmission gears (V4L, V1H, V5L, V2H).

8. A method for a dual clutch transmission device with a main group (10) and a final shift rear-mounted group (11) and a coupling device (12) for coupling a main group transmission element of the main group (10) to a final shift group transmission element of the final shift group (11), said transmission comprising two transmission gears (V4L, V5L, V1H, V2H) which can be formed simultaneously with one of the transmission gears (V4L, V5L) assignable to a lower group of the final shift group (11) and another of the transmission gears (V1H, V2H) assignable to an upper group of the final shift group (11), with a main group transmission element of the main group (10) coupled to a final shift group transmission element fo the final shift group (11), the final shift group (11) comprising a planetary wheel transmission (14), and the final shift group transmission element being a planetary wheel carrier (15) of the planetary wheel transmission (14), said method comprising the step of:

forming two transmission gears (V4L, V5L, V1HL, V2H) and assigning one of the transmission gears (V4L, V5L) to a lower group of the rear-mounted group (11) and one of the transmission gears (V1H, V2H) to an upper group of the rear-mounted group (11).

9. The method according to claim 8, including the step of switching engagement of power shift clutches (K1, K2) for a change from one of the transmission gears to another one of the transmission gears.

\* \* \* \* \*